Feb. 16, 1960 H. J. BALES ET AL 2,925,017
SKIN EDGE MILLING MACHINE
Filed April 28, 1958 3 Sheets-Sheet 1
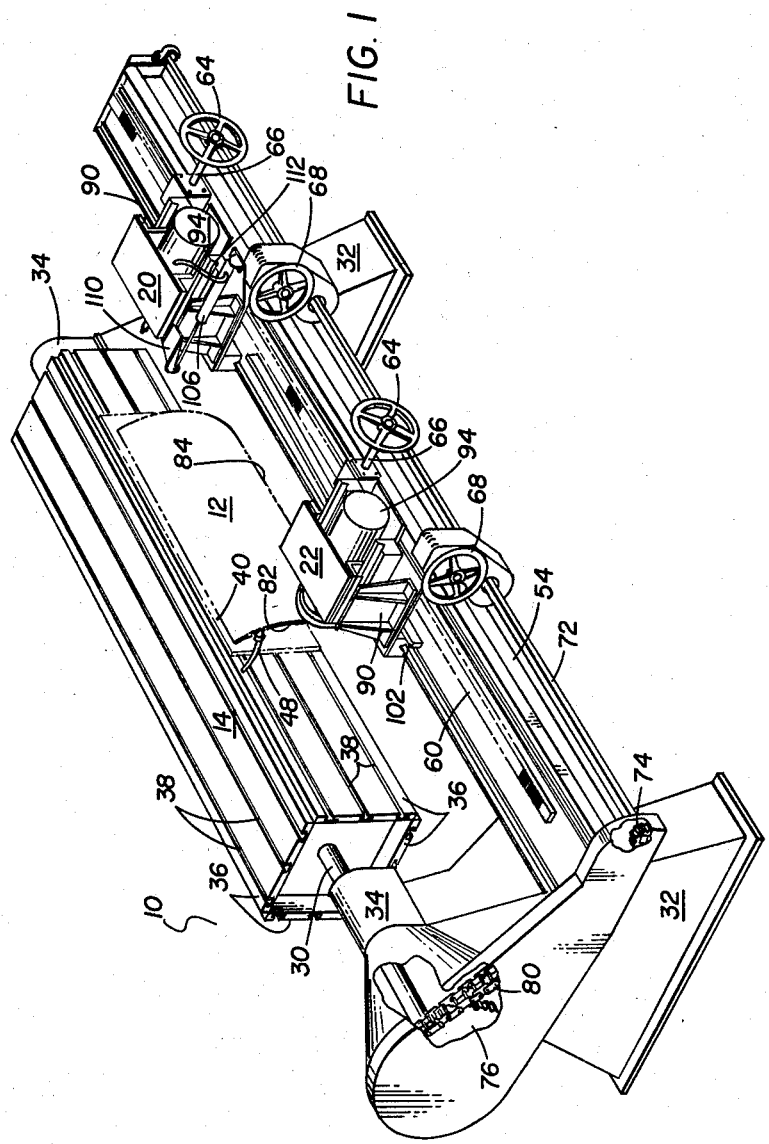
INVENTOR.
HAROLD J. BALES
EUGENE W. BRYAN
BY

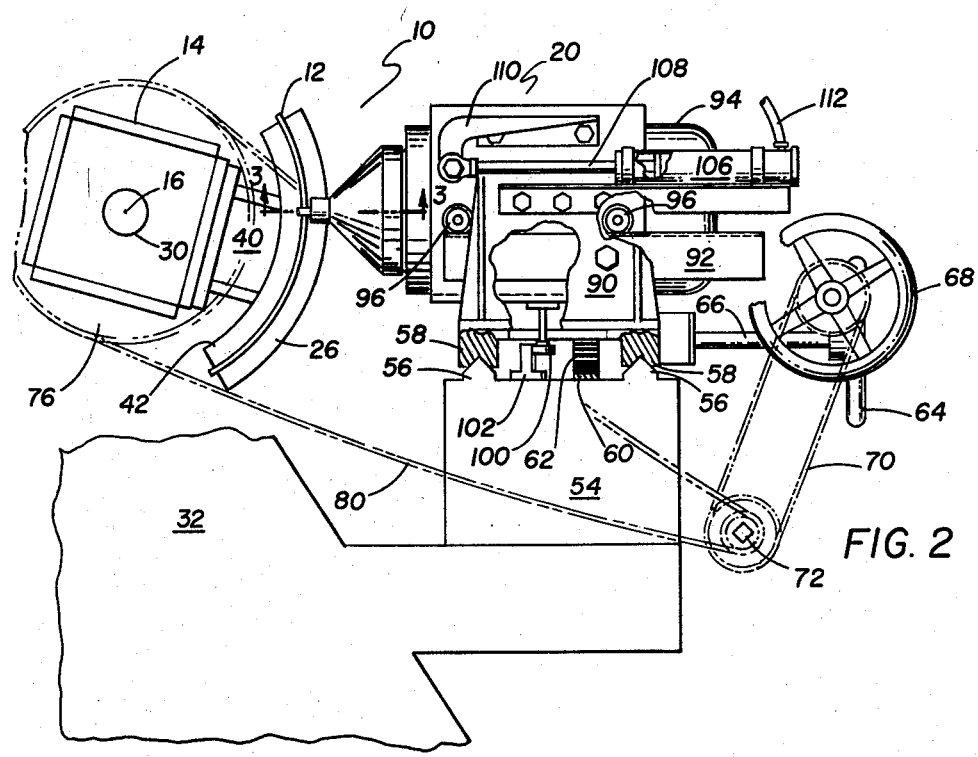
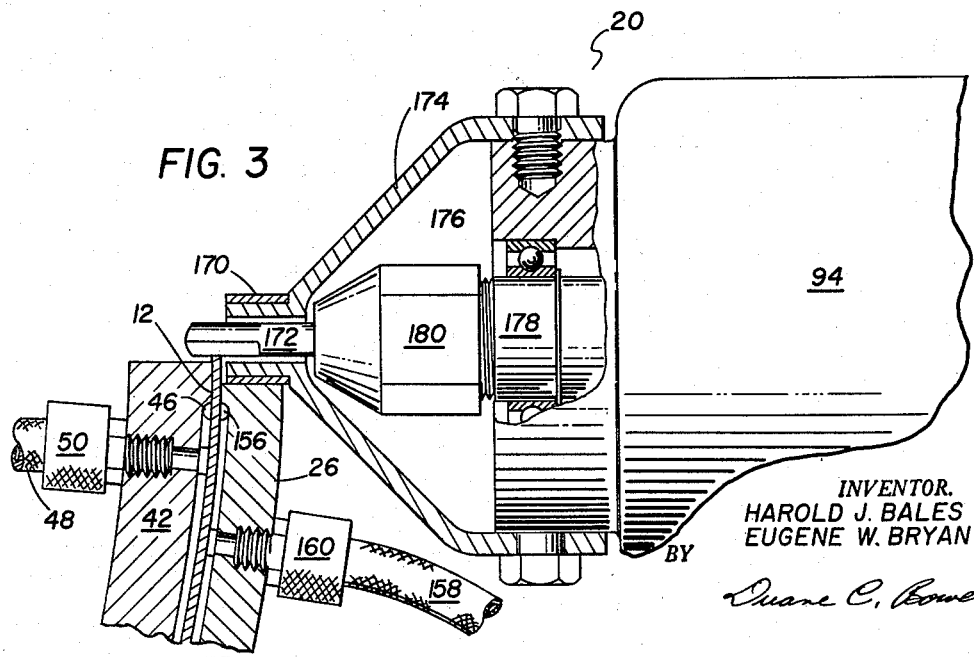

INVENTOR.
HAROLD J. BALES
EUGENE W. BRYAN
BY
Duane C. Bowen

United States Patent Office 2,925,017
Patented Feb. 16, 1960

2,925,017

SKIN EDGE MILLING MACHINE

Harold J. Bales, Wichita, and Eugene W. Bryan, Canton, Kans., assignors to Boeing Airplane Company, Wichita, Kans., a corporation of Delaware Application April 28, 1958, Serial No. 731,443

10 Claims. (Cl. 90—13.4)

Our invention relates to a machine for milling or shaping the edges of sheet material. More particularly, our machine is adapted for milling the edges of a skin section from a body having circular cross sections such as an aircraft missile.

In the construction of aircraft missiles and the like, improved means is needed to mill the edges of skin sections. The body from which the skin section is taken may be cylindrical, frusto-conical or the like. In each case the body cross sections are generally circular, e.g., the outline of the body envelope may be generated by the rotation of a straight or curved line about the body axis. Requirements of such an edge milling machine include precision edge milling with tolerances in the order of ±.005 or less and ability to mill on paths longitudinal and transverse of the body axis or on diagonal, irregular and curved lines.

The objects of our invention include: to devise improved means for milling and shaping the edges of skin sections or the like, particularly those from a body having circular cross sections; to provide such milling means capable of precision work; to provide a machine of this type to work from a template having the desired edge contour; to provide a relatively simple and straightforward design so that close tolerances can be met and so that wear of the machine will have a minimum effect on such tolerances; and to provide such a milling machine which requires a minimum of labor and expense for the milling operation insofar as this is consistent with other requirements.

Our invention will be best understood, with additional objectives and advantages thereof, from the following description, read with reference to the drawings, in which:

Figure 1 is a perspective view of a skin edge milling machine forming a specific embodiment of our invention;

Figure 2 is an enlarged side view, partly in section, of the cutter-supporting carriage shown at the right in Figure 1, the cutter being shown in the process of milling a skin section supported on the machine mandrel;

Figure 3 is a fragmentary view, principally in section, taken on line 3—3 of Figure 2;

Figure 5:
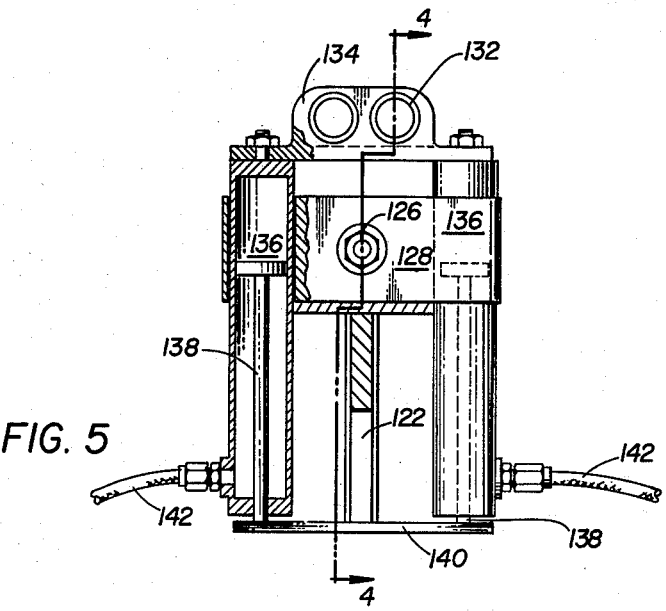
Figure 5 is an enlarged fragmentary view, partly in section, taken on line 5—5 of Figure 4.

The skin edge milling machine 10 shown in Figure 1 in the protoype was adapted to take skin sections 12 as much as 8 feet long and curved on an arc as much as 4 feet in diameter. Skin section 12 is shown as being a section from an aircraft body of cylindrical configuration and rectangular in plan view. However, the machine is adapted to mill the edges of skin sections or the like of any given configuration in plan view. Skin 12 is supported on a mandrel 14. The mandrel axis of rotation 16 has the same position relative skin section 12 as the body axis from which the skin section is taken. In other words, in Figure 2 the center of the circular arc formed by skin 12 would be coincident with mandrel axis 16.

Figure 1 shows two different cutter supporting carriages 20 and 22. Both are permanently mounted on the machine so that either carriage can be selected. Skin section 12 has an underlaid template 24 with carriage 22 and an overlaid template 26 with cutter carriage 20. The carriages are essentially alike except for a few parts and of course it is desirable for economy of manufacture and maintenance that the parts be identical insofar as possible. For convenience of observing the similarities and dissimilarities in carriages 20, 22, most of the parts that are identical will be given the same reference numeral and the parts that are different will be given different reference numerals.

Mandrel 14 is formed about a shaft 30 which is rotatably supported to pivot about a horizontal axis 16 by base members 32 having shaft bearing means 34. Mandrel 14 is of box construction having four plates 36 with T-shaped slots 38 to secure supporting means for the work. Work supporting means is shown in Figures 1 and 2, and includes a base 40 secured to one of the mandrel plates 36 by bolt clamping means engaged in T-slots 38. A skin section 12 is held in place by a vacuum chuck arrangement such as vacuum chuck 42 in Figures 2 and 3 or vacuum chuck 44 in Figure 4. Chucks 42, 44 have grooves 46 in their faces and vacuum is applied through lines 48 connected to the vacuum chucks by fittings 50 so that air pressure acting on skin sections 12 will secure them in place.

Base means 32 support the bed 54 on which carriages 20, 22 are mounted. V-shaped ways 56 are provided on bed 54 and the carriages have grooved foot portions 58 sliding on ways 56. In large machines, anti-frictional rolling means may be incorporated in the ways so that the friction of sliding contact will not interfere with feel through the hand wheels. A rack member 60 is secured to bed 54 and a pinion 62 on each carriage driven by a hand wheel 64 acting through shaft 66 engages rack 60. A second hand wheel 68 on each carriage is connected to a common shaft 72 by an endless chain 70. Shaft 72 has a sprocket 74 at its end connected to a sprocket 76 secured to mandrel shaft 30 by an endless chain 80. Rotation of hand wheel 68 thus will result in rotation of mandrel 14.

Figure 4:
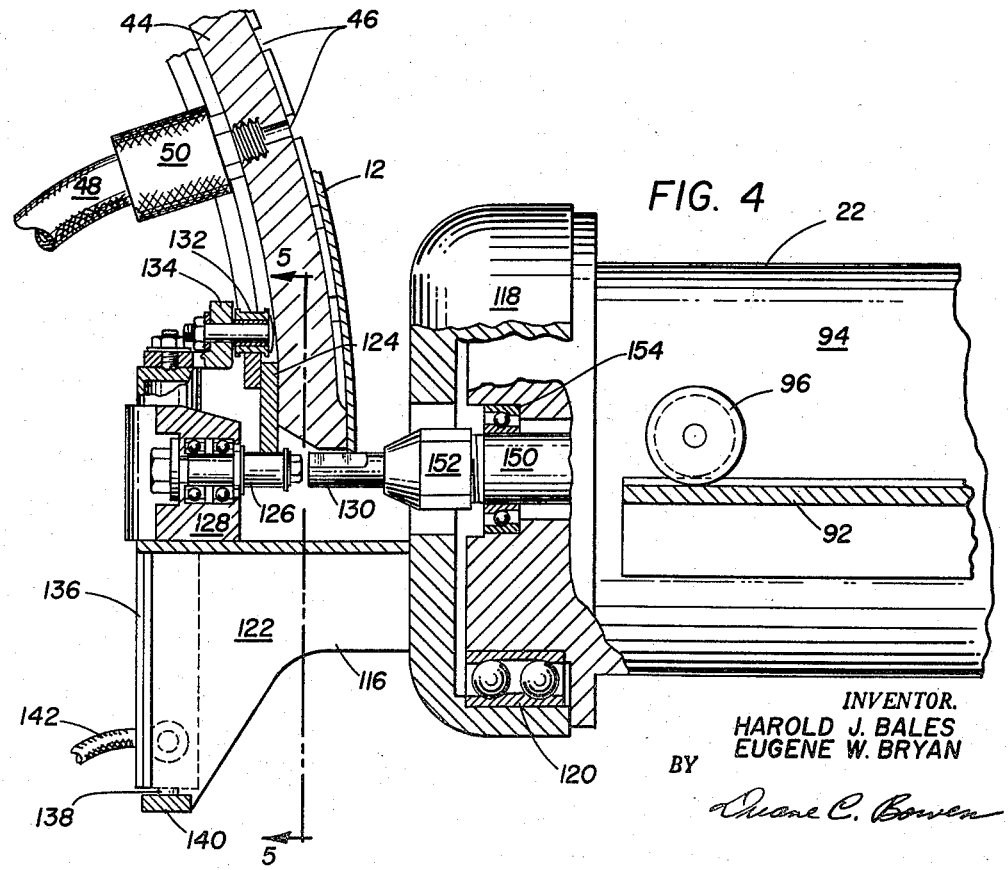
Figure 4 is an enlarged fragmentary view, principally in section, showing part of the cutter carriage at the left in Figure 1, the cutter being shown milling the bottom edge of a skin section supported on the machine mandrel.

By operation of both hand wheel 64 and hand wheel 68 on one of the carriages, the cutter on the carriage may be given any desired movement relative to the edges of skin section 12. The cutter can be moved at right angles to mandrel axis 16 along part edge 82 in Figure 1 by movement only of hand wheel 68 rotating the mandrel. Conversely, the cutter means can be moved in a direction parallel to mandrel axis 16 along part edge 84 in Figure 1 by movement of hand wheel 64. Movement of both hand wheel 68 and 64 at the same time will result in a diagonal, broken or curved path in any selected direction. A guide for the movement of the hand wheels is obtained by templates 24, 26 (Figures 4 and 3 respectively). Either movement of the cutter relative the skin is prevented in other than the desired direction or the desired path is tactually sensed through the hand wheel.

Each carriage includes end plates 90 supporting paired track members 92 directed toward mandrel 14. A motor and cutter supporting housing 94 has rollers 96 mounted on track members 92. Housing 94 includes an electric motor for driving the cutter.

The movement of cutter housing 94 toward and away from mandrel 14 is controlled in a different way in carriages 20 and 22. In Figure 2, the movement of the cutter housing 20 is controlled by a depending follower member 100 bearing on a template 102 secured on machine bed 54. Follower 100 is pressed against guide template 102 by air pressure applied through a cylinder 106 secured to plate 90. A piston and a piston rod 108 are secured to cutter housing 94 by a bracket 110. When air pressure is applied through a line 112, follower 100 is pressed against template 102. If the skin section 12 being milled is cylindrical, then template 102 would be parallel to mandrel axis 16. If the skin section is from a frusto-conical body, then template 102 would form an angle to mandrel axis 16. The purpose of the template is to locate the associated cutter in position to mill the edge of the skin section and the template location compensates for changes in diameter of the body from which the skin section is taken.

In the carriage 22 shown in Figure 4, the movement of cutter housing 94 along track 92 is controlled by a gooseneck arm assembly 116 shown in Figure 4. Gooseneck arm assembly 116 includes an annular support 118 rotatably and coaxially supported on housing 94 by ball bearing means 120. A web 122 extends toward mandrel 14. One roller 126 is supported coaxial with cutter 130 by bearing means 128 on web 122. A pair of rollers 132 are supported by a crosshead member 134 between a pair of air cylinders 136 having pistons and piston rods 138 connected together by a crosshead plate 140 secured to web 122. Air lines 142 connect with cylinders 136 whereby the pistons and cylinders act to press rollers 132 toward roller 126.

Template 24 is of picture-frame configuration and is pressed on outer and inner edges by rollers 126, 132. This not only serves to guide cutter 130 and cutter housing 94 in the desired path around the template but also controls the movement of cutter 130 and housing 94 toward and away from the mandrel, rollers 126 and 132 being flanged. The automatic control of movement of cutter 130 toward and away from the mandrel is especially desirable if the skin section 12 is from a tapered or other non-cylindrical body whereby various portions of the skin surface are at different distance from mandrel axis 16.

Cutter 130 in Figure 4 may be of a typical type used in edge trimming, shaping and milling operations. It is secured to the motor shaft 150 by a chucking device 152. Motor shaft 150 is supported adjacent cutter 130 by bearing means 154.

In the Figure 3 construction showing carriage 20, a template 26 is an overlay to skin 12 and is held in place by air pressure. A vacuum is applied to grooves 156 on the inner face of template 26 through a line 158 connected to template 26 by a fitting 160. Whereas the inner and outer edges of the picture-frame template 24 in Figure 4 control the path of the cutter, the edges of the vacuum plate template 26 in the Figure 3 construction control the desired contour of skin 12. Rather than having a positive engagement between means on the cutter housing 94 and the template as in Figure 4, in the Figure 3 construction the edges of template 26 are observed and are tactually sensed through hand wheels 64 and 68. An annular roller template follower 170 is rotatably mounted concentric with cutter 172 by a supporting housing 174. Housing 174 encloses cutter chuck 180. In the simplest form, annulus 170 is merely slipped on the end of housing 174 and is rotatable with respect to the same. The end of motor shaft 178 to which chuck means 180 is secured by supported by antifrictional bearings 176.

In the operation of the skin edge milling machine, skin section 12 and a template of the Figure 3 or Figure 4 construction are secured in place. Skin section 12 will have been generally shaped prior to this milling operation and may have been shaped before or after being formed into the desired curvature. The carriage 20 or 22 used depends on the type of template. The skin edge is milled by operation of hand wheels 64 and 68. The cutter path is automatically followed when template 24 (Figure 4) is used and the cutter path is observed and tactually sensed when template 26 (Figure 3) is used. The embodiment of the machine shown is adapted for small volume precision work. The mechanism is adaptable for automatic type control if large production runs are to be processed.

The specific embodiment shown has a simple, straightforward mechanism for accomplishing the designed job including the following features: (1) The skin section to be milled is secured on the mandrel with the mandrel axis corresponding to the body axis from which the skin is taken. (2) The cutter axis of rotation is normal to and intersects the mandrel axis and hence the plane of the milled edge surface is generated by a line normal to the mandrel axis, e.g., the cutter axis. Therefore, the edges of adjacent skin sections, milled with this same relationship of work, mandrel and cutter, will be substantially parallel so that a precision abutment will be achieved.

These relationships are readily achieved when the skin section is taken from a body having substantially circular cross sections. However, the machine can be adapted for other work. Regardless of the overall shape of the body, similar relationships exist if the skin section being cut is curved on a substantially circular arc. The edges cut will not necessarily be exactly parallel to adjacent skin edges but this may not be important depending on the tolerances allowable between abutting edges. Sheets can be milled that are curved on other than circular arcs, i.e., elliptical, parabolic or irregular, but calculations have to be made as to how to locate the sheets relative the mandrel so that the cuts will be within tolerances. Some problems are alleviated in such cases by use of a cutter having a conical or other non-cylindrical shape. With the use of non-cylindrical cutters, the cutter axis of rotation does not have to intersect the mandrel axis. In summary, other types of curved plates can be edge milled and the relationship of machine parts can be modified but some sacrifice must be made as to simplicity of part design and machine operation and the problem of keeping within tolerances is aggravated. The machine is excellently adapted for edge milling of bodies having circular cross sections and is adaptable for a substantial number of other applications.

Having thus specifically described our invention, we do not wish to be understood as limiting ourselves to the precise details of construction shown, but instead wish to cover those modifications thereof which will occur to those skilled in the art from our disclosure and which fall within the scope of our invention, as described in the following claims:

We claim:

1. In a cutting system including a cutter and cutter support means therefor, said system being adapted to cut the edges of a sheet, the improvement comprising: a picture-frame shaped template contoured generally like the sheet to be cut and the picture-frame shape providing inner and outer template edges, a gooseneck arm having proximal and distal ends and said proximal end being attached to the cutter support means and said cutter support means movably supporting said cutter and said arm proximal end so that they can be moved together laterally of said template, said distal end of said arm engaging said inner and outer edges of said picture-frame shaped template whereby, when relative movement occurs between said template and said arm and said cutter, said distal end of said arm follows the contours of said edges of said picture-frame shaped template and said cutter follows a substantially congruent path to cut the edges of the sheet, sheet support means overlaid to said template and of similar size, said sheet support means being positioned in a plane between said cutter support means and said template whereby the sheet edges are positioned to be cut by said cutter.

2. The subject matter of claim 1 in which said distal end of said arm has a pair of rollers bearing on said inner and outer edges of said template and means pressing the rollers together, said proximal end of said arm being rotatably supported by said cutter support means to pivot about the cutter axis, a mandrel and means pivotally supporting said mandrel, said sheet support means and template being supported by said mandrel, said template and said sheet support means having similar curvatures with the centers of the arcs forming said curvatures being close to the mandrel pivotal axis, first manually operable means connected to said cutter support means and operative to move said cutter substantially parallel to said mandrel pivotal axis and second manually operable means operative to pivot said mandrel whereby edges of a curved sheet mounted on said sheet support means can be cut by said cutter by relative movement therebetween achieved by operation of said first and second manually operable means.

3. The subject matter of claim 1 in which said template and said sheet support means have similar curvatures and in which said cutter support means supports said cutter for movement in the direction of the cutter axis so that said cutter can follow the edges of a sheet to be cut which has a curvature similar to the curvatures of said template and said sheet support means, said cutter being moved in the axial direction by the action of said distal end of said arm engaging the edges of said template.

4. In a cutting system, including a rotary cutter and cutter support means therefor, operative to cut the edges of a sheet having a curvature, the improvement comprising: a template substantially congruent with said sheet and having a similar curvature, said template being juxtaposed to one face of said sheet so that the edges of said template and said sheet border each other, the edges of said template forming guiding surfaces, a guide follower secured to said cutter support means and extending therefrom and engaging said guiding surfaces of said template and said cutter support means being operative to support said cutter to follow the movements of said guide follower laterally of the template when relative movement occurs between said template and said follower, and operating means operable to produce relative movement between said template and said follower, whereby as said guide follower follows said guiding surfaces of said template said cutter follows a substantially congruent path positioned to cut the edges of said sheet.

5. The subject matter of claim 4 in which said template is overlaid to said sheet and said guide follower is an annular roller concentric with said cutter and bearing on the edges of said template, said cutter passing through said roller so that said cutter is disposed to cut the edges of said sheet while said roller is disposed to follow said template edge guiding surfaces.

6. The subject matter of claim 5 in which the sheet abutting face of said template is formed with vacuum grooves and a vacuum source is connected thereto whereby the template is held in place on said sheet by air pressure.

7. The subject matter of claim 4 in which there is a mandrel and means pivotally supporting said mandrel, said template and said sheet being mounted on the side of said mandrel and the centers of the arcs forming said curvatures of said template and said sheet being close to the mandrel pivotal axis, said operating means to produce relative movement between said template and said follower including first manually operable means operative to move said cutter substantially parallel to said mandrel pivotal axis and second manually operable means operative to pivot said mandrel whereby relative movement between said cutter and said sheet to cut said sheet edges is controlled by said first and second manually operable means.

8. The subject matter of claim 7 in which said first and second manually operable means each includes a hand wheel whereby the following of said template by said follower may be tactually sensed through said manually operable means.

9. The subject matter of claim 7 in which there is a vacuum chuck supporting said sheet on said mandrel, said vacuum chuck having a curved contour matching the curve of said sheet.

10. The subject matter of claim 7 in which said cutter support means supports said cutter for movement toward and away from said mandrel, means pressing said cutter toward said mandrel, and a template bar supported substantially parallel to the mandrel pivotal axis and a follower member connected to said cutter and bearing on said template bar limiting the movement of said cutter toward said mandrel, whereby said cutter may be moved inward and outward responsive to differences in the radii of sheet curvature by means of said template bar.

References Cited in the file of this patent

UNITED STATES PATENTS

| | | |
|---|---|---|
| 2,399,806 | Johnson | May 7, 1946 |
| 2,660,931 | De Vlieg | Dec. 1, 1953 |
| 2,723,598 | Mann | Nov. 15, 1955 |
| 2,785,608 | Walti | Mar. 19, 1957 |
| 2,791,157 | Calhoun | May 7, 1957 |
| 2,807,180 | Adams | Sept. 24, 1957 |
| 2,826,123 | Leverington | Mar. 11, 1958 |